United States Patent
Hung

(10) Patent No.: US 9,207,411 B2
(45) Date of Patent: Dec. 8, 2015

(54) FIBER CONNECTOR

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 133 days.

(21) Appl. No.: 13/931,753

(22) Filed: Jun. 28, 2013

(65) Prior Publication Data

US 2014/0248022 A1    Sep. 4, 2014

(30) Foreign Application Priority Data

Mar. 1, 2013  (TW) ............... 102107143 U

(51) Int. Cl.
*G02B 6/42*  (2006.01)

(52) U.S. Cl.
CPC .............. *G02B 6/4204* (2013.01); *G02B 6/421* (2013.01); *G02B 6/4292* (2013.01); *G02B 6/423* (2013.01); *G02B 6/424* (2013.01); *G02B 6/4262* (2013.01)

(58) Field of Classification Search
CPC .. G02B 6/4201; G02B 6/4204; G02B 6/4208; G02B 6/421; G02B 6/423; G02B 6/424; G02B 6/4262; G02B 6/4292
USPC ................................................. 385/33, 88–94
See application file for complete search history.

(56) References Cited

U.S. PATENT DOCUMENTS 6,942,398 B2 *    9/2005   Morioka ........................ 385/93

* cited by examiner

*Primary Examiner* — Akm Enayet Ullah
*Assistant Examiner* — Michael Mooney
(74) *Attorney, Agent, or Firm* — Novak Druce Connolly Bove + Quigg LLP

(57) ABSTRACT

A fiber connector includes a case, a light emitting element, and a fiber. The case includes a lower seat and a fiber receiving portion connected to one end of the lower seat. The lower seat defines a receiving recess with an end surface. An optical coupling portion protrudes downward from the end surface. The fiber receiving portion defines a blind hole. The light emitting element is received in the receiving recess and faces the optical coupling portion. The fiber is received in the blind hole. Light rays emitted from the light emitting element are converged to the fiber by the optical coupling portion.

10 Claims, 3 Drawing Sheets

FIBER CONNECTOR

BACKGROUND

1. Technical Field

The present disclosure relates to fiber connectors and, particularly, to a fiber connector with an adjustable optical coupling portion.

2. Description of Related Art

Fiber connectors generally include a light emitting element, a case, and a fiber. The case covers the light emitting element and includes a convex lens aligned with the light emitting element. Light rays emitted from the light emitting element are converged by the convex lens and then project to the fiber. In different applications, the convex lens may be designed to obtain difference convergences depending on needs and thus the whole case should be changed in the different applications. This increases cost and decreases efficiency.

Therefore, it is desirable to provide a fiber connector, which can overcome the limitations described.

DETAILED DESCRIPTION

Embodiments of the disclosure will be described with reference to the drawings.

Figure 1:
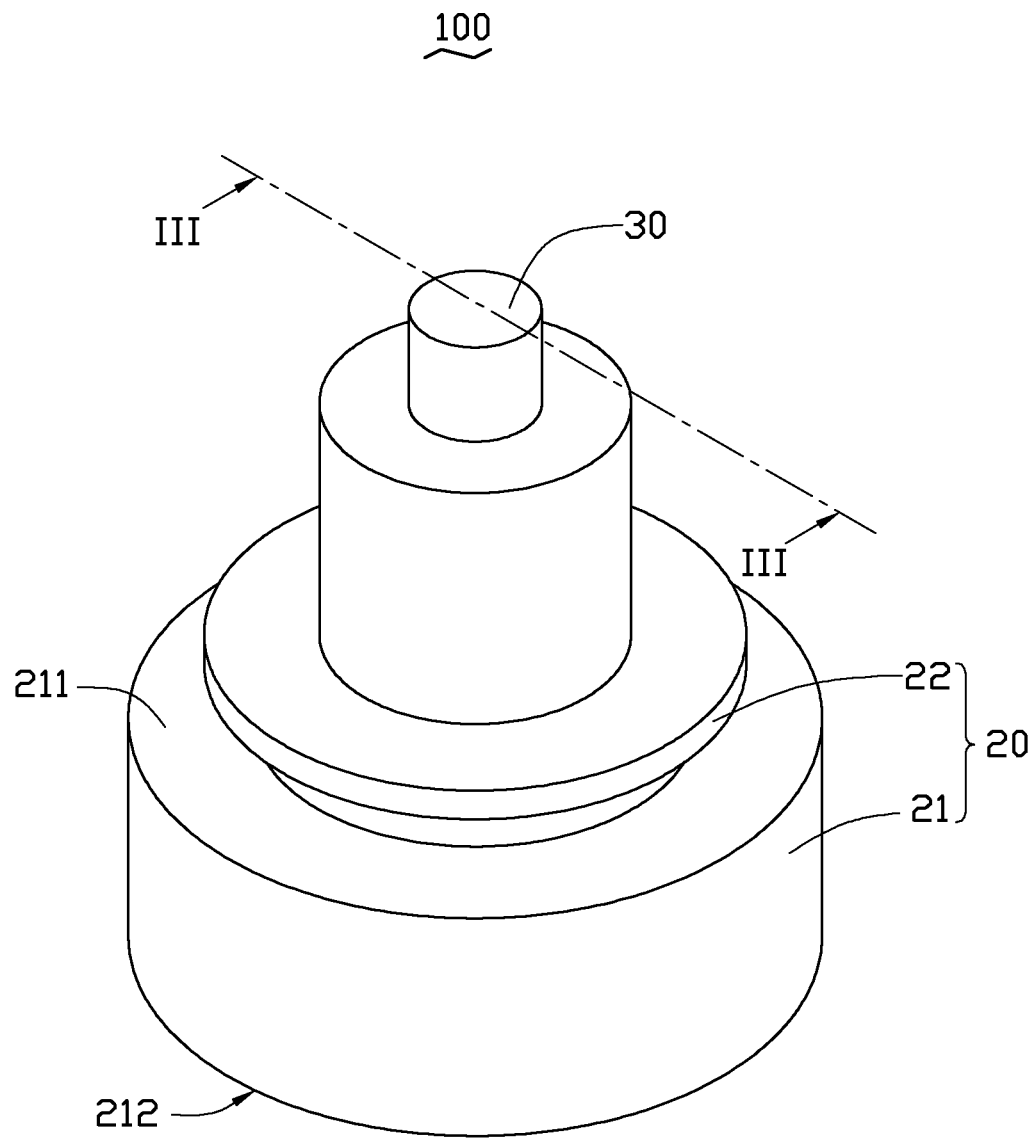
FIG. 1 is a schematic, isometric view of a fiber connector in accordance with an exemplary embodiment.
Figure 2:
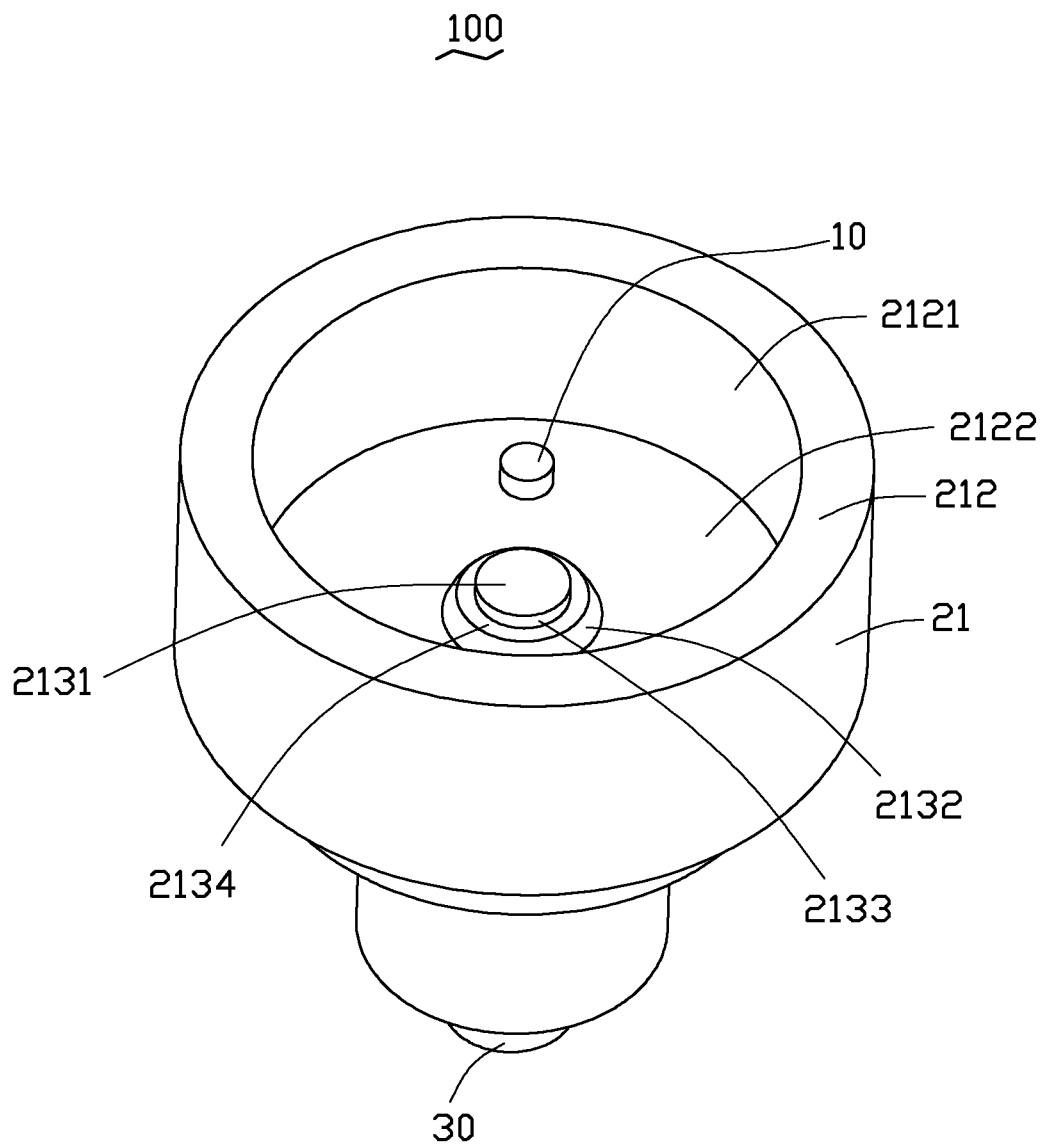
FIG. 2 is similar to FIG. 1, but viewed from another angle.
Figure 3:
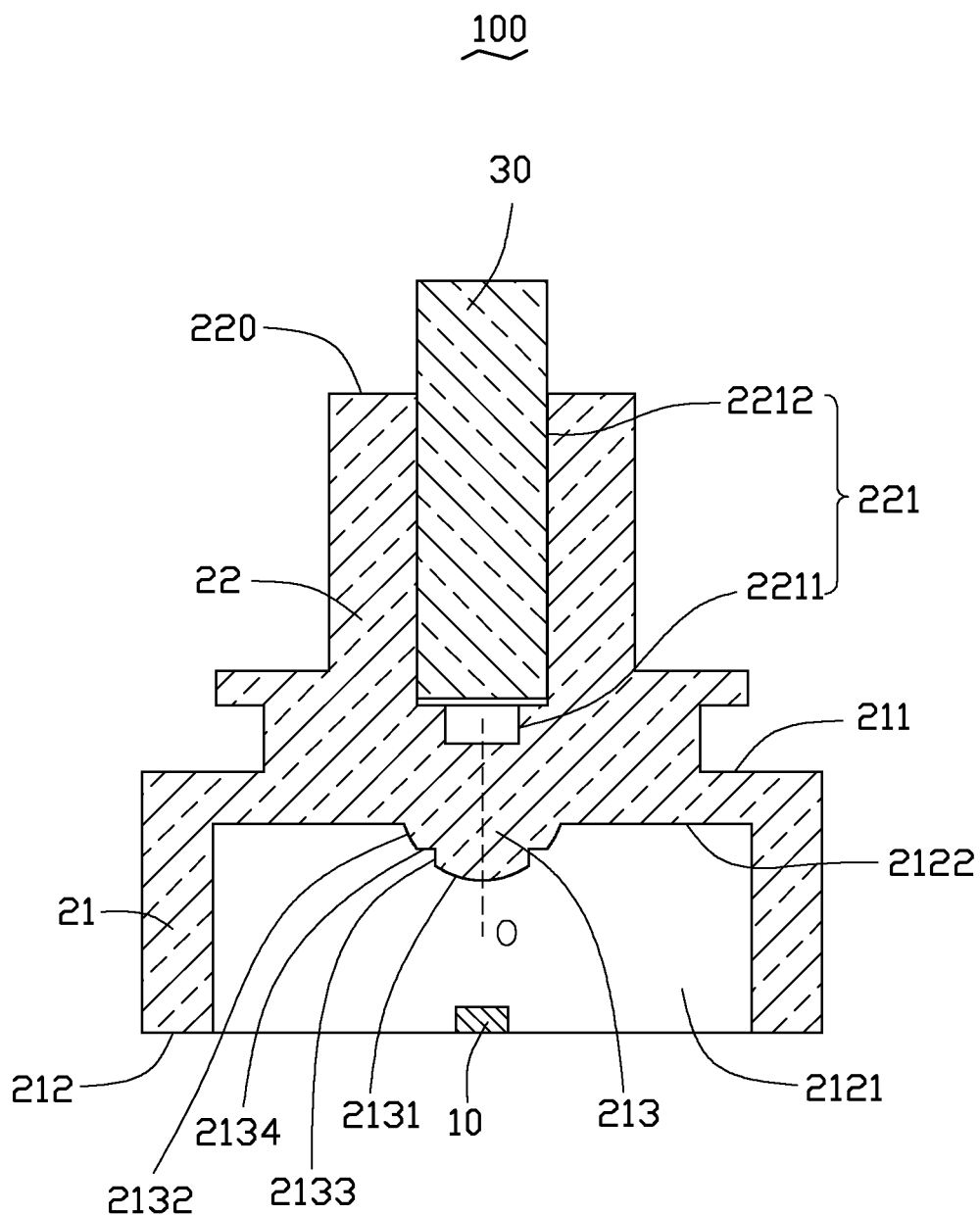
FIG. 3 is a cross-sectional view taken along a line III-III of FIG. 1.

FIGS. 1-3 show a fiber connector 100 according to an exemplary embodiment. The fiber connector 100 includes a light emitting element 10, a case 20, and a fiber 30.

The light emitting element 10 emits light rays. In the embodiment, the light emitting element 10 is a laser diode, the laser diode converts electrical signals to the light rays.

The case 20 is made of transparent plastic, and is integrally formed. The case 20 includes a cylindrical lower seat 21 and a cylindrical fiber receiving portion 22 connected to one end of the lower seat 21. An external diameter of the lower seat 21 is greater than an external diameter of the fiber receiving portion 22.

The lower seat 21 includes a top surface 211 and a bottom surface 212 opposite to the top surface 211. The lower seat 21 defines a receiving recess 2121 in the bottom surface 212. The receiving recess 2121 is cylindrical, and includes an end surface 2122 parallel with the bottom surface 212. An optical coupling portion 213 protrudes downward from a central of the end surface 2122. The optical coupling portion 213 is formed by cutting an aspheric convex lens, and includes an optical axis O. The optical coupling portion 213 includes a converging surface 2131 and a diffusing surface 2132. The converging surface 2131 faces the bottom surface 212. The diffusing surface 2132 connects to the end surface 2122. The converging surface 2131 and the diffusing surface 2132 are formed on one same aspheric surface.

The optical coupling portion 213 further includes a first cutting surface 2133 and a second cutting surface 2134. The first cutting surface 2133 and the second cutting surface 2134 are connected between the converging surface 2131 and the diffusing surface 2132. The first cutting surface 2133 is a cylindrical surface, and is connected between the second cutting surface 2144 and the converging surface 2131. The second cutting surface 2133 is an annular surface, and is connected to the diffusing surface 2132 and the first cutting surface 2133. The first cutting surface 2133 is perpendicular to the end surface 2122, and the second cutting surface 2134 is perpendicular to the first cutting surface 2133. Central axes of the first cutting surface 2133 and the second cutting surface 2134 are collinear with the optical axis O.

The fiber receiving portion 22 extends upward from the top surface 211. The fiber receiving portion 22 is cylindrical, and includes an upper surface 220 forming on one end facing away the lower seat 21. The fiber receiving portion 22 defines a blind hole 221 on the upper surface 220. The blind hole 221 includes a light incident hole 2211 and a receiving hole 2212 communicating with the light incident hole 2211. The light incident hole 2211 is adjacent to the top surface 211, and the receiving hole 2212 extends through the upper surface 220. The light incident hole 2211 and the receiving hole 2212 are cylindrical, and central axes of the light incident hole 2211 and the receiving hole 2212 are collinear with the optical axis O. An internal diameter of the receiving hole 2212 is greater than an internal diameter of the incident hole 2211. The internal diameter of the incident hole 2211 is corresponding to an external diameter of the fiber 30. A distance from the incident hole 2211 to the bottom surface 212 is greater than a distance from the top surface 211 to the bottom surface 212.

The fiber 30 is configured for transmitting the light rays.

In assembly, the light emitting element 10 is received in the receiving recess 2121 and faces the converging surface 2131 of the optical coupling portion 213. The fiber 30 is received in the receiving hole 2212.

In use, a part of the light rays emitted from the light emitting element 10 is projected on the converging surface 2131, and another part of the light rays is projected on the second cutting surface 2134. The light rays projected on the converging surface 2131 will be converged to the light incident hole 2211, and then enter into the fiber 30. The light rays projected on the second cutting surface 2134 will be refracted outward from the fiber receiving portion 22, and will not be coupled to the fiber 30. Therefore, an amount of the light rays coupling to the fiber 30 can be controlled by adjusting an area ratio between the converging surface 2131 and the second cutting surface 2134. For example, when the area ratio between the converging surface 2131 and the second cutting surface 2134 is 1:1, one half of the light rays will be projected to the converging surface 2131 and coupled to the fiber 30, another half of the light rays will not be coupled to the fiber 30.

In other embodiment, the shape of the optical coupling portion 213 can be cut after the case 20 is molded. Therefore, the case 20 will not be remolded again, which decreases the cost of the fiber connector 100.

In other embodiments, the blind hole 221 can just include the receiving hole 2212, and does not include the light incident hole 2211. Therefore, the fiber 30 received in the receiving hole 2212 will be directly coupled to the optical coupling portion 213.

In other embodiments, the first cutting surface 2133 can be adjusted to other shapes, such as paraboloid.

In other embodiments, the optical coupling portion 213 can just include the first cutting surface 2133 and the converging surface 2131. The first cutting surface 2133 extends to the end surface 2122.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A fiber connector, comprising:
a case comprising a lower seat and a fiber receiving portion connected to one end of the lower seat; the lower seat defining a receiving recess comprising an end surface, the case comprising an optical coupling portion protruding downward from the end surface; the optical coupling portion being an aspheric convex lens, the convex lens having an aspheric surface and defining a ring-shaped cutout in the aspheric surface, the fiber receiving portion defining a blind hole;
a light emitting element received in the receiving recess and facing the optical coupling portion; and
a fiber received in the blind hole, light rays emitted from the light emitting element being converged to the fiber by the optical coupling portion.

2. The fiber connector of claim 1, wherein the lower seat comprises a top surface and a bottom surface opposite to the top surface, the fiber receiving portion extends upward from the top surface, the fiber receiving portion comprises an upper surface on one end facing away from the lower seat.

3. The fiber connector of claim 2, wherein the receiving recess is defined in the bottom surface, and the blind hole is defined in the upper surface, a central axis of the blind hole is collinear with an optical axis of the optical coupling portion.

4. The fiber connector of claim 3, wherein the blind hole comprises a light incident hole and a receiving hole communicating with the light incident hole, the light incident hole is adjacent to the top surface, and the receiving hole extends through the upper surface; the fiber is received in the receiving hole.

5. The fiber connector of claim 4, wherein an internal diameter of the receiving hole is greater than an internal diameter of the incident hole.

6. The fiber connector of claim 2, wherein the optical coupling portion comprises a converging surface, and the light emitting element faces the converging surface.

7. The fiber connector of claim 6, wherein the optical coupling portion comprises a first cutting surface connected to the converging surface, and the first cutting surface is a cylindrical surface.

8. The fiber connector of claim 7, wherein the optical coupling portion comprises a diffusing surface and a second cutting surface, the second cutting surface is connected between the diffusing surface and the first cutting surface, and the second cutting surface is an annular surface.

9. The fiber connector of claim 8, wherein the diffusing surface is connected to the end surface.

10. The fiber connector of claim 8, wherein the diffusing surface and the converging surface are formed on one same aspheric surface.

* * * * *